(No Model.)

W. I. ALVORD.
KNOB ATTACHMENT.

No. 347,412. Patented Aug. 17, 1886.

Witnesses
S. S. Williamson
E. Stewart Sumner

Inventor
Williston I. Alvord
By Smith & Hubbard
Att'ys

UNITED STATES PATENT OFFICE.

WILLISTON I. ALVORD, OF BRIDGEPORT, CONNECTICUT.

KNOB ATTACHMENT.

SPECIFICATION forming part of Letters Patent No 347,412, dated August 17, 1886.

Application filed January 2, 1886. Serial No. 187,330. (No model.)

*To all whom it may concern:*

Be it known that I, WILLISTON I. ALVORD, a citizen of the United States, residing at Bridgeport, in the county of Fairfield and State of Connecticut, have invented certain new and useful Improvements in Knob Attachments; and I do hereby declare the following to be a full, clear, and exact description of the invention, such as will enable others skilled in the art to which it appertains to make and use the same.

My invention relates to certain novel and useful improvements in knob attachments, and has for its object to attach the knob-spindles to the hubs, and secure them in this position in a simple and effective manner and without the use of any screws; and with these ends in view my invention consists in certain details of construction and combination of elements hereinafter explained, and then specifically designated by the claims.

Figure 1:
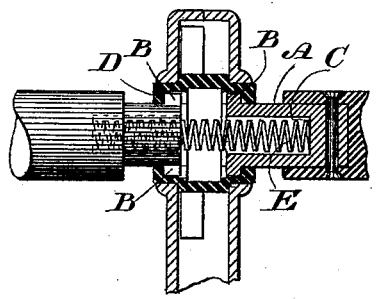
Figure 2:
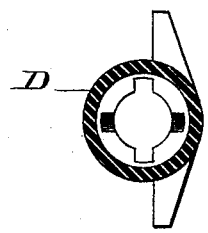
Figure 3:
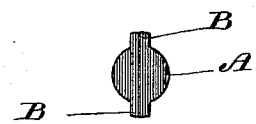

Figure 1 is a longitudinal section showing the knob-shanks attached within the hub, one of the shanks being shown in section and the other in elevation; Fig. 2, a detail cross-section of the hub; and Fig. 3, an end view of the knob-shank, showing the shape of the head.

Similar letters denote like parts in the several figures of the drawings.

A is the knob-shank, which terminates in a head, B. The forward portion of the shank is hollow, as seen at C.

The latch-hub D has an opening extending through the same, said opening being enlarged at the central portion of the hub, and corresponding at the sides to the shape of the heads B. Recesses are formed within the end walls of the enlarged inner opening, said recesses corresponding to the projections on said heads.

E is a coil-spring interposed between the two knob-shanks within the opening C.

In assembling my devices I insert the heads B within the hub with the coil-spring E in position within the openings C in both shanks. The shanks are then forced inward against the resiliency of the spring, and then given a quarter-turn, so as to bring the angles or projections of the head out of alignment with the outer openings of the hub and directly opposite to counter-recesses, which correspond to the shape of the head in cross-section in the same manner as set forth in my patent granted November 10, 1885, No. 330,188. The pressure is now removed from the shanks, and the spring will throw the latter backward until the heads are in the said counter-recesses, thereby holding said shanks as against retraction. In removing the shanks the latter are forced inward, thereby compressing the spring, and then given a quarter-turn, which will bring the heads into alignment with the outer openings of the hub, and the shanks may be readily withdrawn.

It is immaterial whether a single or a sectional hub is used, since my improvement is of course applicable to any hub; also, the openings in the shanks may be dispensed with, as they only serve as a ready means for introducing the spring and keeping it in place, and I can make the shanks solid and place the spring in the hub between the ends of the heads, the advantage of the hollow shanks being that a longer spring can be used, and more spring-play thereby afforded.

Having thus described my invention, what I claim as new, and desire to secure by Letters Patent, is—

1. In combination with a latch-hub, recessed, as shown, the knob-shanks terminating in heads adapted to be inserted within the hub and held there against retraction, and a coil-spring interposed between the shanks and adapted to keep the latter apart and in attachment with the hub, substantially as set forth.

2. The shanks A, having openings C and terminating in heads B, in combination with the hub D, recessed to accomodate said heads, and the coil-spring E, interposed between said shanks within said openings, as specified.

In testimony whereof I affix my signature in presence of two witnesses.

WILLISTON I. ALVORD.

Witnesses:
S. S. WILLIAMSON,
E. S. SUMNER.